No. 861,358. PATENTED JULY 30, 1907.
C. G. DAVIS.
SKIRT GUARD AND BRAKE FOR BABY CARRIAGES.
APPLICATION FILED SEPT. 24, 1906.
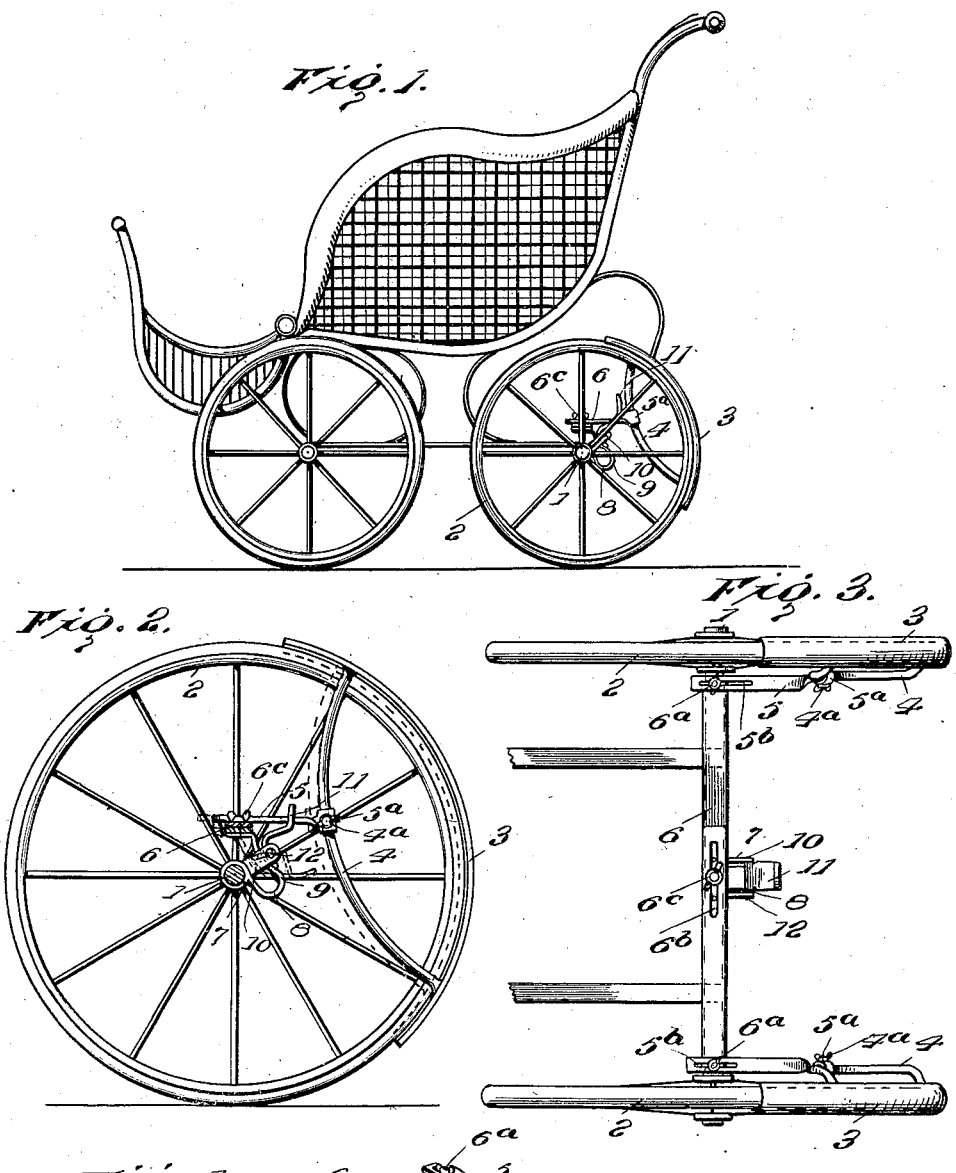

UNITED STATES PATENT OFFICE.

CLEVELAND G. DAVIS, OF MANISTEE, MICHIGAN.

SKIRT-GUARD AND BRAKE FOR BABY-CARRIAGES.

No. 861,358.           Specification of Letters Patent.           Patented July 30, 1907.

Application filed September 24, 1906. Serial No. 335,952.

*To all whom it may concern:*

Be it known that I, CLEVELAND G. DAVIS, a citizen of the United States, residing at Manistee, in the county of Manistee and State of Michigan, have invented certain new and useful Improvements in Skirt-Guards and Brakes for Baby-Carriages and Go-Carts, of which the following is a specification.

The object of my invention is to provide an improved combined skirt guard and brake for baby carriages or go-carts, and the invention consists essentially of a device of this character which will effectively protect the skirt of the nurse or other attendant from the rims of the rear wheels when pushing the carriage or go-cart, and which will be composed of comparatively few and simple parts that may be readily applied to any baby carriage or go-cart without altering the same, which will be durable and easily operated to constitute a brake applied to the rear wheels, and which will be adjustable so as to fit carriages or go-carts with wheels of different diameters or with the wheels at different distances apart.

For a full description of the invention and the merits thereof and also to acquire a knowledge of the details of construction of the means for effecting the result, reference is to be had to the following description and accompanying drawings, in which:

Figure 1 is a side elevation of my improved skirt guard and brake applied to baby carriages and go-carts. Fig. 2 is an enlarged view taken through the rear axle of the vehicle. Fig. 3 is a top plan view. Fig. 4 is a detail perspective view of one section of the supporting bar.

Corresponding and like parts are referred to in the following description and indicated in all the views of the drawings by the same reference characters.

Referring to the drawing, the numeral 1 designates the rear axle of the baby carriage or go-cart, and 2 the wheels thereof. The guards 3, which also constitute brake shoes for the rims of the wheels, are curved and also dished or concave transversely and they are adjustably secured to two bracket arms 4 that are adjustably mounted by set screws 4ª upon the offset or laterally extending ends 5ª of the arms 5, whereby they may be tilted to assume different positions with respect to the vertical. The arms 5 are carried on the ends of the transversely extending supporting bar 6 and the said arms are slotted as indicated at 5ᵇ and receive the thumb screws 6ª on the supporting bar 6, whereby the said arms may be adjusted or extended to hold the guards or brake shoes at the proper relative position, so that the device may be accommodated to baby carriages or go-carts with wheels of different diameters.

Supporting bar 6 is preferably constructed in two sections, as shown, said sections overlapping at the meeting ends and extensible one with the other by means of a slot and thumb screw connection 6ᵇ, 6ᶜ. By this means the supported bar may accommodate itself to baby carriages or go-carts with the wheels at different distances from each other.

The supporting bar 6 is secured to the rear axle 1 by means of a clip 7 which is detachably secured to the rear axle and which is secured to or formed integrally with a spring plate 8 extending rearwardly as shown and bowed or returned upon itself as indicated at 9, the said bowed portion extending between two upwardly extending integral ears 10 formed on the plate 8 and being clipped at its extremity to the bar 6 as shown. A locking catch 11 is provided at opposite edges with pintles or lugs 12 by which it is journaled in apertures at the upper ends of the ears 10, and one end of this locking catch is designed to bear against the returned spring portion of the plate 8 so as to press the same downwardly and thereby carry the guards and brake shoes 3 into an engagement with the rims of the wheels 2. This locking catch 11 is so arranged as to spring past the center when it is engaged with the plate 8 and thereby hold itself in locked position.

From the foregoing description in connection with the accompanying drawing, it will be seen that I have provided a construction of skirt guards or brakes for baby carriages or go-carts in which when the device is applied the brake shoes will at all times serve as fenders for the rear wheels and thus guard the skirt from contact with said rims. Whenever it is desired to lock the wheels from turning the said guards and brake shoes 3 may be clamped against the rims of the wheels by manipulating the locking catch 11, as above described, said catch holding itself in locking position when turned down as illustrated in Fig. 2 in dotted lines. The device, it will be noted, is adjustable so that the improvement may be applied to baby carriages or go-carts with wheels of varying diameters as well as in cases where the wheels are closer together or farther apart.

While I have herein shown and described the supporting bar 6 and the arms 5 as extensible, it is to be understood that the invention is not to be limited to the extensible features of these parts, as they may be made rigidly connected together if desired.

Having thus described the invention, what is claimed as new is:

1. A skirt guard and brake for baby carriages and the like, comprising a pair of wheel fenders, arms on which said fenders are mounted to turn, means for holding said fenders at different angles with respect to the arms, a supporting bar to which said arms are connected, means for attaching said bar to the axle of a baby carriage, and means for moving said bar so as to carry the fenders into engagement with the rims of the wheels.

2. A skirt guard and brake for baby carriages and the like, comprising a supporting bar designed to extend transversely between the wheels of a baby carriage, means for yieldingly connecting said bar to the axle between said wheels, arms mounted upon the ends of said bar and having an adjustable connection therewith in the direction of the rims of the wheels, a pair of fenders secured to the respective arms, and means for moving said supporting bar in a direction to clamp the fenders against the rims of the wheels.

3. A skirt guard and brake for baby carriages and the like, comprising a pair of wheel fenders, curved brackets secured to said fenders, arms to which said brackets are adjustably secured, means for holding said fenders at different angles with respect to the arms, a supporting bar to which said arms are connected, means for attaching said bar to the axle of a baby carriage, and means for moving the bar in a direction to bind the fenders against the rims of the wheels.

4. A skirt guard and brake for baby carriages and the like, comprising a pair of wheel fenders provided with curved brackets, arms to which said brackets are adjustably connected, means for holding said fenders at different angles with respect to the arms, said arms being provided at one end with slots, a transversely extending supporting bar provided at its ends with set screws received in the slots of said arms, whereby to adjustably connect the arms to the bar, means for attaching said bar to the axle of a baby carriage, and means for moving the said bar in a direction to bind the fenders against the rims of the wheels.

5. A skirt guard and brake for baby carriages and the like, comprising a pair of wheel fenders, arms on which said fenders are mounted to tilt, means for holding said fenders at different angles with respect to the arms, a supporting bar to which said arms are connected, and means for attaching said bar to the axle of the baby carriage, and for locking said bar in position to hold the fenders against the rims of the wheels.

6. In a device of the character described, a pair of wheel fenders and a supporting bar therefor, and a clip for attaching said bar to the axle, said clip being provided with a spring plate having spaced apart ears and a returned portion extending between said ears, the extremity of said returned portion being secured to the said supporting bar, and a locking catch journaled between said ears and arranged for engaging with the said returned portion of the plate, as and for the purpose set forth.

In testimony whereof I affix my signature in presence of two witnesses.

CLEVELAND G. DAVIS. [L. S.]

Witnesses:
F. H. STONE,
GENEVA M. STONE.